United States Patent [19]
Cioni et al.

[11] 3,860,107
[45] Jan. 14, 1975

[54] FEED FIXTURE FOR HANDLING MACHINES OF VIALS OR THE LIKE

[76] Inventors: Elisabetta Cioni; Lucia Cioni; Rovena Anichini Cioni, widow, all of Via di Marciano 22, Siena, Italy

[22] Filed: Jan. 24, 1974

[21] Appl. No.: 436,389

[30] Foreign Application Priority Data
Jan. 29, 1973    Italy.................................... 9316/73

[52] U.S. Cl................. 198/131, 198/151, 198/203
[51] Int. Cl............................................. B65g 17/12
[58] Field of Search ........... 198/131, 151, 179, 198, 198/203

[56] References Cited
UNITED STATES PATENTS
872,855   12/1907   Shook.............................. 198/151
3,513,963   5/1970   Witte................................ 198/131
3,707,219   12/1972   Seragnoli........................... 198/131

*Primary Examiner*—Evon C. Blunk
*Assistant Examiner*—Richard K. Thomson
*Attorney, Agent, or Firm*—McGlew & Tuttle

[57] ABSTRACT

Feed or advance fixture comprising an endless belt element, which is flexible and inextensible, with shoulders or projections and recesses on the outer surface to engage a plurality of members similar to one another, and forming the seats for the containers; a clamping plug cooperates with the inner endless surface of the belt flexible element to engage the projections and recesses of the flexible element to corresponding recesses and projections in the member to be fixed, the plug or pin forming a tooth for the engagement by a toothed disc.

Application to machines designed for the handling of vials.

5 Claims, 11 Drawing Figures

PATENTED JAN 14 1975

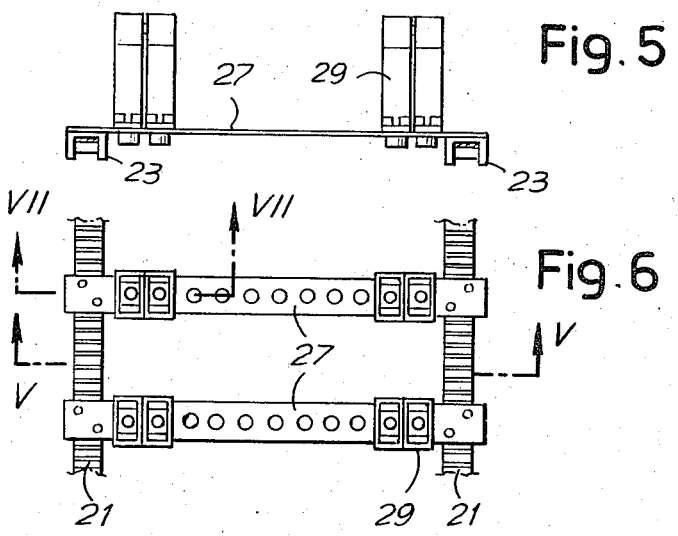
Fig. 5
Fig. 6
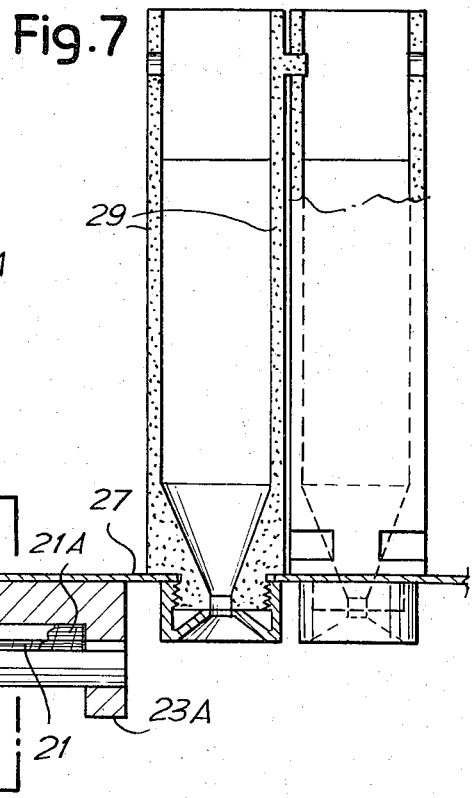
Fig. 7
Fig. 8

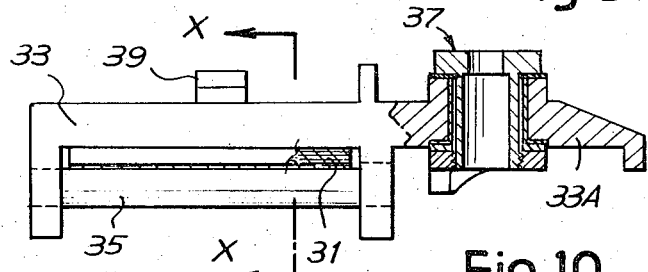
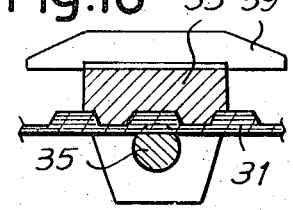
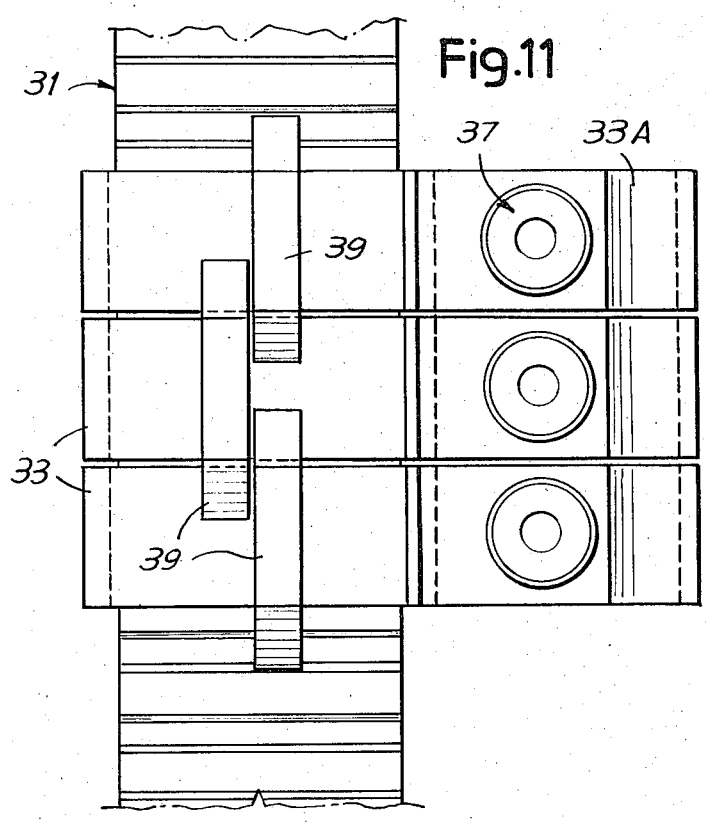

FEED FIXTURE FOR HANDLING MACHINES OF VIALS OR THE LIKE

The invention relates to a fixture to be usually combined to machines designed for the handling of vials and other containers, both for the manufacture, and for the filling, and for the closure of said containers.

The object of the invention is to set up a continuous type transport system (advancing with a continuous or intermittent motion) which avoids the forming of plays between seat and seat and avoids any extension in the conveyor active member and in general in order to reach a more regular motion than hitherto obtained. Moreover, another object of the invention is to set up a transport system which is more resistant to the outside even corrosive agents, such as may be the products for the washing or for the filling of the containers. Another object is to set up a conveyor which avoids the necessity of a frequent lubrication and also avoids an excess of noise.

According to the invention, there are provisions to set up a conveyor with multiple seats or housings for the containers in question, with an endless belt element, which is flexible and inextensible, and has shoulders or projections and recesses on the outer surface to engage a plurality of members similar to one another, and forming the seats for the containers; each of said members is engaged to the endless belt element by a clamping plug cooperating with the inner endless surface of the belt flexible element with the aim of engaging it with its own projections and recesses to corresponding recesses and projections provided in the member to be fixed, while the same plug or pin forms a tooth for the engagement by a feed or advance and transmission member having a toothed disc.

The endless belt elements may be engaged alone to engage the elements forming one or more seats, or they may be used in pairs to support cross elements, each of which forms more seats or housings. The installation may be made with a vertical or horizontal or however inclined arrangement of the lying plane of the or of each belt element.

A member to be engaged to the belt element advantageously presents two wings which flank the shaped surface to be coupled to the projections and recesses of the outer surface of the belt element; on said wings there are formed seats or housings for the plug or pin, which may advantageously have a circular cross-section except a flattened portion designed for the contact with the belt element.

The accompanying drawing illustrates some embodiments given as examples not restricting the setup of the invention. In the drawing:

FIGS. 5 and 6 illustrate a second embodiment of an endless conveyor, with two belts and transversal jumpers connecting the two belts, in a section taken along the line V—V of FIG. 6 and in a partial plan view;

FIG. 7 illustrates an enlarged local section taken along the line VII—VII of FIG. 6;

FIG. 8 illustrates a local section taken along the line VIII—VIII of FIG. 7;

FIGS. 9, 10 and 11 illustrate an additional embodiment in a cross-section, in a section taken along the line X—X of FIG. 9 and in a plan view.

Figure 1:
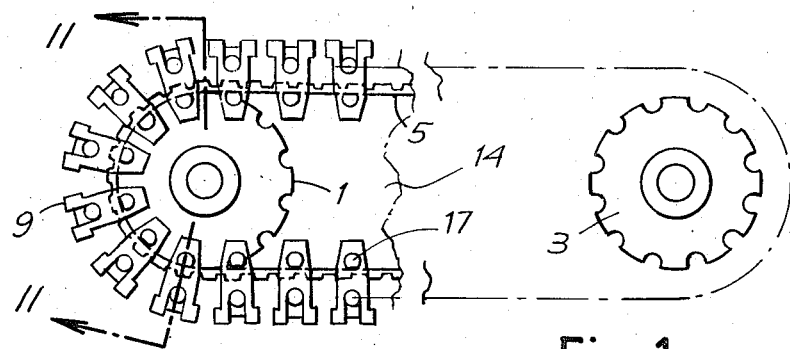
FIG. 1 illustrates a simplified plan view of an endless conveyor.
Figure 2:
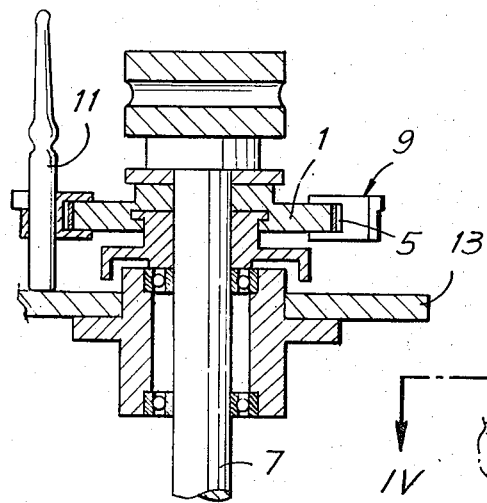
FIG. 2 illustrates an enlarged vertical cross-section taken along the line II—II of FIG. 1.
Figure 3:
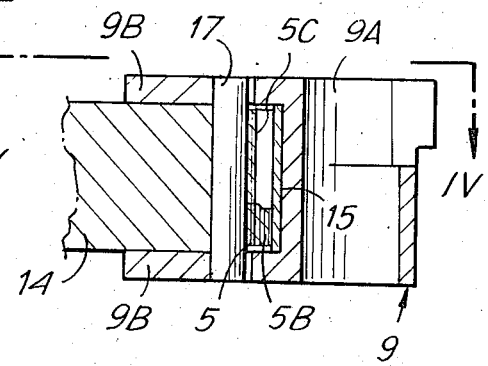
FIG. 3 illustrates an enlarged detail of FIG. 2.
Figure 4:
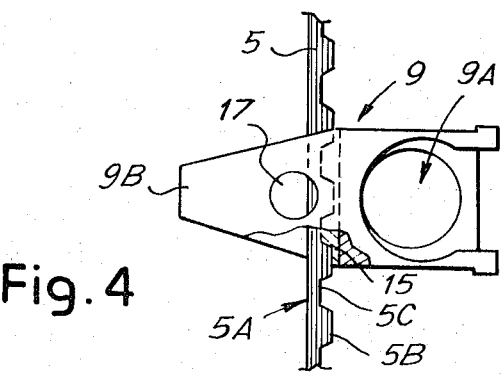
FIG. 4 illustrates a plan view from the line IV—IV of FIG. 3.

According to the accompanying drawing, 1 and 3 indicate two transmission wheels which lie in horizontal planes to support an endless belt element 5, which is transmitted along them in the hereinafter indicated manner. The wheel 1 is at least developed as a gear or toothed wheel, with teeth and recesses of a particular shape formed as recesses having a semi-circular profile at least in the bottom and spaced from one another. 7 denotes the control shaft of the wheel 1.

The belt 5 is developed to afford the inner surface 5A smooth, while the outer surface is provided with projections 5B and recesses 5C, with an arrangement similar to that provided for the toothed belts, but external instead of internal in the array of the belt being assembled.

Along the belt element 5 there are applied members 9 forming seats or housings 9A for the vial body 11 or for other equivalent containers to be handled. The seats 9A may be through and the containers 11 in this case may lie on a plane 13 arranged under the endless belt element 5. The elements 9 present two wings 9B which form a recess designed to accommodate the belt element 5 and to form the engaging system to a guide plate 14. The recess bottom defined by the two wings 9B is provided with a built-in element 15, which is fixed to the element 9 and which is negatively shaped but corresponding to the shape formed by the outer projections 5B and by the outer recesses 5C of the belt element; in this way, by pressing the belt element 5 against the built-in element 15 and fixed to the element or member 9, one assures the firm connection of the member 9 considered to the belt element 5. In order to obtain the coupling pressure, there is provided a plug or pin 17 which is inserted into corresponding seats of the wings 9B and which accomplishes the dual function of acting on the surface 5A of the belt element (to engage it to the built-in element 15) and of forming a tooth along the inner surface 5A of the belt element 5. The plug or pin 17 advantageously presents a flattened portion to co-act with the surface 5A of the belt element.

As on the belt element there are applied — regularly speed — several members 9 forming the seats 9A, after all with the pins 17, one forms an inner assembly of teeth along the surface 5A to cooperate with the recesses of the wheel 1. It is thus possible to actuate the belt element 5 forming the conveyor and thus the assembly of the seats 9A for the containers 11, by means of a continuous motion or a tripping motion.

The belt element 5 may be set up with per se known techniques and already used, for instance, the setup of geared belts, of V-shaped belts and other similar articles, which do not afford any yielding and extension, while on the other hand, they assure a regular continuous motion. An endless conveyor as indicated results to be stronger to the external agents than the chain conveyors contemplated in the preceding setups of machines of the above hinted type. The conveyor results to be relatively very noiseless and does not require any particular maintenance or particular lubrication.

In FIGS. 5 to 8, an arrangement is provided similar to the one already described. 21 denotes two flanked endless belt elements, which present, on the outer surface, projections 21A and recesses 21B, designed to cooperate with correspondingly shaped surfaces of members 23 to be applied to the belts; the members 23, for this purpose, present each a pair of wings 23A, between which the belt element is to be accommodated and between which the shaped surface is formed to cooperate with the projections and the recesses of said element; a plug or pin 25, accommodated in seats formed in the wings 23A, stabilizes the coupling between the belt element and the corresponding element 23. Two elements 23 correspond to each other on the two belts 21 and are connected by a jumper 27, which is shaped to form respectively to engage a plurality of seats for containers to be conveyed. According to the drawing, each jumper 27 supports a plurality of blocks 29 forming seats for elements to be conveyed, such as vials or other containers.

As in the preceding case, the belt elements 21 may be engaged and advanced exploiting the plugs or pins 25 as seizing teeth to cooperate with discs profiled with teeth and recesses.

In FIGS. 9, 10 and 11 there is shown an embodiment in which a belt element 31, similar to those already described, engages a plurality of members 33 with the aid of plugs or pins 35, which assure the coupling between projections and recesses of the belt element 31 and corresponding contours formed by the members 33. Said members have lateral projections 33A, which form respectively bear means 37 to form seats designed to accommodate the containers or other objects to be conveyed. 39 denotes shaped projections formed by the members 33 and which serve to prevent the curving of the chain in the direction opposite the winding direction on the transmission means.

It is intended that the drawing only illustrates an embodiment given only as a practical demonstration of the invention, said invention being in conditions as to be varied in the forms and arrangements without however departing from the scope of the concept which informs the same invention.

What is claimed is:

1. Endless conveyor fixture for vials, bottles or other containers, for the manufacture, the filling and the closure of the same containers, including: toothed disc rotary advance members, an endless, flexible and inextensible, annular belt element, with a smooth inner surface and projections and recesses on the outer surface; a plurality of members, similar to each other, each forming at least one seat or housing for container, each of said members including a surface provided with recesses and projections and adjacent said surface a seat for a clamping plug; a clamping plug or pin that can be inserted into the seat of said each member to cooperate with the endless inner surface of the flexible belt element, to force it with its own projections and recesses against said recesses and projections in the respective member, said plug or pin forming a tooth for the engagement by said feed toothed disc members.

2. Fixture as in claim 1, wherein a single endless belt element is used to engage elements forming the seats.

3. Fixture as in claim 1, wherein endless belt elements are used in pairs and wherein said members similar to one another are developed like transversal elements, each of which forms several seats and is engaged to both belt elements.

4. Fixture as in claim 1, wherein a member forming at least a seat, has two wings which flank a surface shaped with recesses and projections to be coupled to the projections and recesses of the outer surface of the belt element; seats for plug being made on said wings.

5. Fixture as in claim 1, wherein said plug is of circular cross-section except a flattened portion serving for the contact with the belt element.

* * * * *